UNITED STATES PATENT OFFICE.

LUDWIG H. REUTER, OF HOBOKEN, NEW JERSEY.

COMPOSITION FOR DISINFECTING, ANTISEPTIC, AND OTHER PURPOSES.

No. 875,380.   Specification of Letters Patent.   Patented Dec. 31, 1907.

Application filed October 31, 1906. Serial No. 341,435.

*To all whom it may concern:*

Be it known that I, LUDWIG H. REUTER, a citizen of the United States, residing at Hoboken, in the county of Hudson and State of New Jersey, have invented a new and useful Composition for Disinfecting, Antiseptic, and Similar Purposes, of which the following is a specification.

Many disinfectants, which are recommended also as insecticides, have no, or hardly any, insecticidal efficiency, while many insecticides, which are advertised to possess disinfectant properties, have not much or practically no value as a disinfectant or antiseptic.

An important object of my invention is to produce a compound, which is at the same time an efficient bactericide and insecticide and is capable of removing also foul odors, etc., and which can be manufactured at such a moderate cost, that its salesprice does not prevent its use in households as a general disinfectant and for agricultural purposes as an insecticide.

A further object of my invention is to produce a highly concentrated disinfectant and insecticide, which is perfectly clear and uniform, which is stable and does not change in tropical or cold climates and which does not consequently become cloudy or thick in cold weather, and which mixes with water in all proportions, producing clear and stable solutions.

I have examined some of the disinfectants and insecticides, which are in the market and I have found that for instance the article "creolin", comprising creosote and alkali resinate, does not dissolve in water under any condition; when creolin is mixed with water, a milky emulsion is obtained, which, if standing for some time, separates some of the creosote; it is obvious that such a product is likely to become a dangerous article in the hands of a layman and more harm than good may result from its use. Other disinfectants containing soaps as principal constituents were found to have the disadvantage of becoming cloudy and thick at a temperature as high as 40 to 50 degrees F. I have found that that is especially the case with liquid soaps containing formaldehyde; such soaps start to become cloudy and to crystallize, viz, to separate salts of fatty acids at 40 to 50 degrees F., even if they contain as much as 15% of the 40% formaldehyde solution of the market; it is evident that such an article,—which in cold weather requires to be redissolved by placing the container for some time in warm water or in a warm room before it can be used for the preparation of standard solutions for sterilizing the field of operation—is not a desirable product either for the physician, who gets a hurried call to a patient or for military camps, railroads or similar purposes, where a disinfectant is required which is absolutely stable at all temperatures—in summer and in winter. I have found also that the addition of about 10% of alcohol or of about 5% of glycerin or the addition of both at the same time, while increasing the costprice of the article, does not prevent the crystallization of such liquid soaps containing formaldehyde—in cold weather—not even when exclusively soft soap (potash soap) has been used in their preparation.

As to the relation between the efficiency and the cost price of articles like creolin, I have to say, that the manufacture of alkali resinate, which enters into the article creolin, requires steam jacketed kettles and a good deal of fuel for cooking and dissolving the rosin in the caustic soda solution; it requires also other tedious manipulations, such as straining and cooling of the boiling hot alkali resinate, before it can be mixed with the creosote. Also for the manufacture of soaps containing formaldehyde, a considerable outlay for heavy machinery is required, viz, for the saponification of fats and oils a steam jacketed kettle is needed, also tanks for cooling the soap before the formaldehyde is added; this precaution is necessary for the purpose of preventing a partial oxidation of the formaldehyde into formic acid and secondary decomposition, resulting in a separation of fatty acids. It is evident that such a process is an expensive one and that the final product cannot be a cheap article. Also disinfectants and insecticides, comprising only soap were found to be expensive, on account of the large percentage (40%–60%) of soap which they are required to contain and which necessitates the addition of another expensive material, namely, alcohol, though the latter does not by any means prevent the liquid from becoming cloudy or thick, viz, from crystallization—in cold weather. Investigations which I have made on that subject, have conclusively proved, that creosote does not give a clear fluid when mixed with a weak soap solution, containing a minimum of soap, for instance, only up to 20% of soap; a clear solution is not obtainable even if the liquid soap used contained 10% of alcohol or 5% of glycerin or both at the same time. I have found that if to 20 parts of soap, dissolved in 35 parts of water—50 parts of creosote are added, no clear solution is obtained, but only a cloudy, milky mass, which separates on standing in two layers and when mixed with water it separates oily drops of creosote. It is evident that such an article cannot be used advantageously for any purpose.

Now I have discovered that a clear liquid is obtainable, which mixes with water in all proportions, producing clear and stable solutions, when to a mixture of water, soap and creosote containing about 20% by weight of soap, and creosote in excess of the soap, formaldehyde is added; for example when to the above mentioned cloudy mass comprising 20 parts of soap, 35 parts of water and 50 parts of creosote there being about two-fifths by weight as much soap as creosote, only a small quantity of formaldehyde is added. I have discovered that, for instance, the addition of 5%-6% formaldehyde gas is sufficient to produce a clear solution, which mixes with water in all proportions without even partial separation of the creosote. This result is I think due to the formation of a new chemical compound, a condensation product of the formaldehyde with cresols contained in the creosote, which being liquid has the tendency to combine with an excess of cresols and some soap in such a way that a clear and stable liquid is obtained, which mixes with water in all proportions. I have found that a liquid of about that composition keeps very well, even in cold weather, and if containing as much as 20% of soap, as stated, keeps well at a temperature for below freezing. Not only the concentrated liquid, but also its dilutions keep very well. Bacteriological experiments have proved that it is very efficient as disinfectant and antiseptic owing to its contents of a liquid formaldehyde-cresol condensation product, which is less irritating, less poisonous and less caustic than the component parts are, when used separately; I have found also that the new product develops a remarkable and lasting efficiency as insecticide, which is due presumably to the peculiar combination of the formaldehyde-cresol condensation product with some soap and an excess of creosote. It is more effective for some purposes if it contains an excess of free creosote and free formaldehyde.

The special features of the new product are:

(1) Its superior efficiency as disinfectant, bactericide and insecticide.

(2) Its low manufacturing costprice.

(3) Its perfect keeping qualities (even in cold weather) and finally the fact that (4) It is clearly miscible with water in all proportions though containing only a small percentage of soap and a large excess of creosote.

Although oils and fats can be used in the manufacture of the new disinfectant and insecticide and be saponified by means of alkalies in the usual way, I prefer to use "red elaine", or "saponified elaine," which is a by-product in the manufacture of stearic acid and contains in addition to oleic acid, its principal ingredient, some stearic and palmitic acid. As elaine dissolves easily in alkalies, no higher temperatures are required, such as are necessary in the process of saponifying fats or oils with caustic alkalies, and much fuel is saved consequently; furthermore elaine is obtainable cheaply in the market and it is much less expensive than would be the proportionate quantity of fats and oils.

As an instance of manufacture, I mix in an ordinary tinned copper kettle, provided with stirring apparatus, 175 lbs. of elaine, 66 lbs. of a 50% caustic potash solution and 21 gallons of water; I continue to stir until all the elaine has been properly combined with the potash, and a soap is produced containing salts of the fatty acids, as potassium oleate, potassium palmitate and potassium stearate respectively. I prefer to use a slight excess of alkali so that the finished product does not contain any uncombined elaine, but I take care that the resulting product does not contain more than about one quarter of one percent of free alkali; then I continue to stir and I add about 500 lbs. of creosote, stirring all the time, until a uniform mixture is obtained; finally I add about 18¾ gallons of the 40% formaldehyde solution of the market stirring until the contents of the kettle have become absolutely uniform and clear. The liquid thus obtained is ready for use and has the above described properties.

I do not wish to limit myself to above mentioned method of procedure or proportions, except as specified in the claims as for certain purposes more or less creosote, formaldehyde or soap may be useful or desirable; instead of using the 40% formaldehyde solution of the market the proportionate quantity of formaldehyde gas may be used and passed into the mixture of creosote and soap, but care must be taken in this case, that the soap-creosote mixture is properly cooled; this precaution is necessary to prevent the formation of insoluble condensation products of formaldehyde with creosote. Instead of the creosote oils of the market, also the proportionate quantity of cresols or of their homologues can be taken, which are the active constituents of the creosotes, obtained by distilling wood or coaltar, and whenever I refer to creosote it is with such equivalents in mind.

I have stated above, that instead of elaine or crude oleic acid also the proportionate quantities of fats or oils can be used and be saponified in the usual way. As the process of dissolving elaine in alkalies is not a saponification process, but a mere neutralization of an acid by means of an alkali, instead of caustic potash also the proportionate quantity of carbonate of potash can be used; in this case care must be taken to remove all the carbonic acid before the addition of the formaldehyde.

Having thus described my invention what I claim is:—

1. A disinfecting and antiseptic composition, comprising 50% of creosote, 5% of formaldehyde and not over twenty per cent. of soap in aqueous solution which is miscible with water to produce a clear and stable solution.

2. A disinfecting and antiseptic composition, consisting of a clear aqueous solution comprising about 20% of soap, about 50% of creosote, and a small amount of formaldehyde, in substantially the described proportions which is miscible in all proportions with water to produce a clear and stable solution.

3. A disinfecting and antiseptic composition, comprising a clear aqueous solution of creosote, formaldehyde, and about two-fifths as much soft soap as creosote, which is miscible with water in all proportions to produce a clear and stable solution.

4. A disinfecting and antiseptic composition comprising an aqueous solution of soap, formaldehyde, and substantially 50% of creosote in aqueous solution, the quantity of creosote being materially in excess of that of soap, which is miscible with water to produce clear and stable solutions.

5. A composition of matter comprising a clear aqueous solution of potassium oleate, creosote and formaldehyde, the creosote constituting substantially one-half, and the potassium oleate substantially one-fifth of the solution in substantially the described proportions.

6. A composition of matter comprising an aqueous solution of 20% of potassium oleate, about 50% of cresols, and formaldehyde.

7. A composition of matter comprising formaldehyde, not over 20% of soft-soap, and creosote in excess of the amount of soft-soap, in aqueous solution, which is miscible with water to produce a clear and stable solution.

In testimony whereof I have hereunto set my hand, in the presence of two subscribing witnesses.

LUDWIG H. REUTER.

Witnesses:
CARL P. SCHLICKE,
FLORENCE G. SHIELDS.